Oct. 3, 1944.  P. C. P. BOOTY  2,359,726
BIRD OR SHUTTLECOCK
Filed June 22, 1942
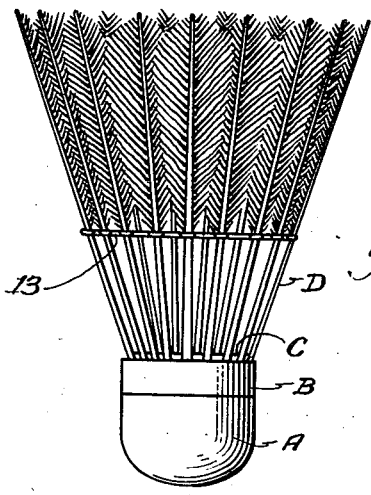
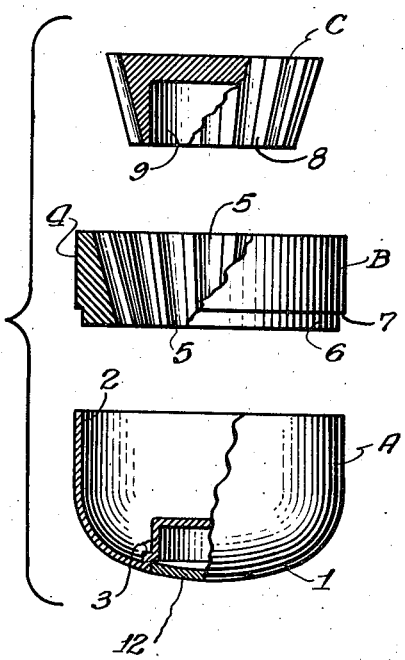
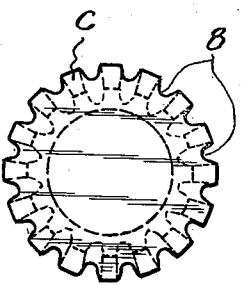
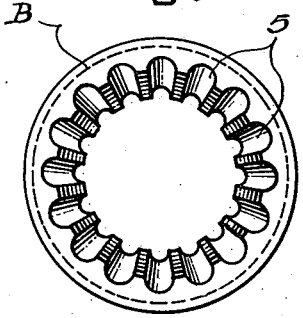
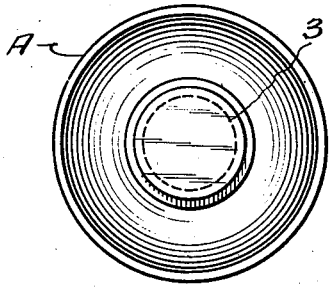
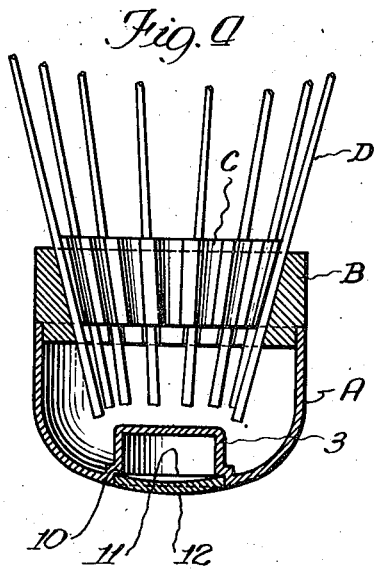
Inventor:
Philip C. P. Booty
By: Leslie W. Fricke
Attorney.

Patented Oct. 3, 1944

2,359,726

UNITED STATES PATENT OFFICE 2,359,726

BIRD OR SHUTTLECOCK

Philip C. P. Booty, Chicago, Ill., assignor to Charles G. Jansky, Oak Park, Ill.

Application June 22, 1942, Serial No. 448,046

6 Claims. (Cl. 273—106)

My invention relates to a bird or shuttlecock such as may be used in playing the games of badminton or battledore and shuttlecock, and the like.

An important object of my invention is to provide a bird or shuttlecock for badminton and like games, constructed of material other than cork, and which bird has the characteristics of resistance to hard usage, lightness and resiliency, and which may be manufactured on a quantity basis at low cost.

Another object of my invention is to provide steps in the method of making birds which comprise forming a ring and an interfitted plug, arranging the feathers between said ring and plug in conical formation and cementing the plug to the ring to hold the feathers in place.

A still further object of my invention is to provide a bird having a hollow body, constructed of material which is resistant to hard usage and which at the same time possesses inherent characteristics of resiliency.

A yet further object of my invention is to provide an improved bird with the body thereof constructed from plastic material, such as cellulose acetate composition, and with a thin wall to afford some degree of resiliency and capable of withstanding, without distortion or damage, the force of blows given it in play.

Another object of my invention is to provide a bird having a thin walled hollow body fashioned with a rounded closed end and an open end, with the feathers supported by a ring and plug assembly, with the radial thickness of the ring greater than the thickness of the wall of the body.

A still further object of my invention is to provide a bird in which the feathers are mounted in selected position in a ring and plug assembly and the assembly secured to the body in permanent relationship.

Another and further object of the invention is to provide a bird comprising parts made of plastic material and in which attainment of the proper weight is achieved by application of a slug to the body.

Another and still further object of my invention is to improve generally birds or shuttlecocks.

The above, other and further objects of my present invention will be apparent from the following description and the accompanying drawing.

The views of the drawing are as follows:

Fig. 1 is a side elevational view of a bird constructed in accordance with the principles of my invention;

Fig. 2 is an exploded view, partially in side elevation and partially in central section, of the plug, ring and body, respectively;

Fig. 3 is a top plan view of the plug, ring and body, respectively; and

Fig. 4 is an enlarged fragmental axial sectional view through the assembled bird and showing the relationship of parts of the completed structure.

The drawing will now be explained.

In carrying out my invention, I form a body A of plastic material, preferably by die casting, with thin walls having a rounded end 1 and an open end 2. The rounded end is cored at 3 axially of the body to form a depression.

A ring B of like material has an outer periphery 4 parallel to its axis and an inner periphery which is inclined, the inner periphery being provided with a plurality of flutes 5. The lower portion of the ring is reduced in diameter at 6 to form a shoulder 7, the depth of the shoulder being substantially that of the thickness of the wall 2 of the body A.

A plug C is formed of the same material and is circular in plan, with its periphery provided with a plurality of flutes 8. There are as many flutes 8 in the plug C as there are in the ring B, so that when the feathers are installed the flutes in the plug and ring will cooperate to embrace the quills of the feathers and retain them in selected position. For the sake of lightness the plug C is cored as at 9.

The recess 3 is formed with an annular shoulder 10. A slug 11 is adapted to be cemented to the shoulder to close the recess. The inner face of the slug is flat and the outer face 12 thereof is curved to conform to the curvature of the rounded end 1 of the body, so that when the slug is in place the surface of the rounded end is unbroken.

The slug 11 may be of metal, if it is necessary to increase the weight of the finished bird or, if the bird is of sufficient weight, the slug may be of the same material of which the body is composed. If desired, the slug may be provided with indicia such for example as a trade-mark, a name of the article or of the seller, or any other indicia which might be desirable to apply.

A set of feathers D is assembled, there being as many feathers used as there are flutes in the ring B. These feathers are fastened together by a cord 13 or other suitable means, in substantially conical shape or form.

To assemble the parts, the group of feathers is inserted in the ring B, with one quill to a flute, the plug C is then applied against the quills and forced tightly into engagement with the quills and ring, suitable cement having been applied to it immediately prior to its installation. This construction constitutes an assembly of ring, plug and feathers which is made prior to the application to the body.

When the assembly has been completed as described, the ring B is then cemented in place in the open end 2 of the body A with the reduced portion 6 entered within the body and the shoulder 7 in contact with the margin of the open end, as may be observed in Fig. 4. Suitable cement is applied to hold the assembly permanently secured to the body.

It will be observed from Fig. 4 that the feathers D are supported solely by the assembly just described, with their inner ends spaced from the interior of the body member. This construction relieves the feathers from the forces imparted to a bird that has been struck by a racket in play and prolongs the life of the bird.

The method of my invention contemplates the formation, by die casting, of a thin walled body member, a ring member having radial thickness greater than the thickness of the wall, a plug, then the assembly of the ring, plug and feathers as a unit, and then the securement of such unit assembly to the body in permanent relationship.

In carrying out my invention, the body, ring and plug may be manufactured by suitable machinery, thus reducing the manufacturing cost to a minimum. The manner of assembling the feathers in the ring reduces manual labor to a minimum so that the completed structure may be manufactured at low cost.

Making the body member of cellulose acetate composition provides certain resiliency in the body member similar to the resilience possessed by a table tennis ball so that striking forces against the ball will not damage it.

As before explained, the slug 11 may be used for weighting the bird or as a closure for the recess if no weight is desired.

I do not intend to limit my invention to the construction shown and described except only in so far as certain of the claims may be so limited as will be apparent to those skilled in the art that changes may be made and equivalents may be substituted without departing from the principles of my invention.

I claim:

1. A bird or shuttlecock for the game of badminton, comprising a hollow thin walled body of plastic material having a rounded closed end and a circular open end, a ring of plastic material having greater radial thickness than the thickness of the body wall cemented in the open end of said body, a plurality of feathers arranged in conical formation with the quills thereof within said ring, and a plug of plastic material within said ring cemented to said ring to thereby retain the feathers in place.

2. A bird as described in claim 1 in which the confronting surfaces of the ring and plug are fluted to receive the feather quills and maintain the same in equidistantly spaced relation, said ring and plug holding said quills in position with their inner ends spaced from the closed end of said body.

3. A bird as described in claim 1 in which the closed end of the body is formed with a cored portion defining a recess, and a slug in said recess, the exterior of said slug conforming to the contour of the rounded end of said body.

4. A bird having an integral molded thin walled body, a ring having greater wall thickness than the wall thickness of said body cemented to said body with the outer peripheral portion of the ring flush with the outer surface of said body, said ring having a portion of reduced diameter entered in said body, and a plug cemented to the interior of said ring, the confronting surfaces of said ring and plug being correspondingly inclined and fluted to support the feathers in inclined position and maintain them in equally spaced relation with the ends of the quills spaced from the inner surface of said body.

5. A bird as described in claim 1 in which the ring includes a portion of reduced diameter entered in the open end of the body and with the outside diameter of the balance of said ring the same as the outside diameter of said body.

6. A bird or shuttlecock comprising a hollow thin walled body having an opening therein, and a feather-supporting assembly secured in said opening, said assembly comprising an interfitting ring and plug, said plug when assembled within said ring clamping the feathers between the engaging plug and ring surfaces.

PHILIP C. P. BOOTY.